United States Patent Office 3,400,734
Patented Sept. 10, 1968

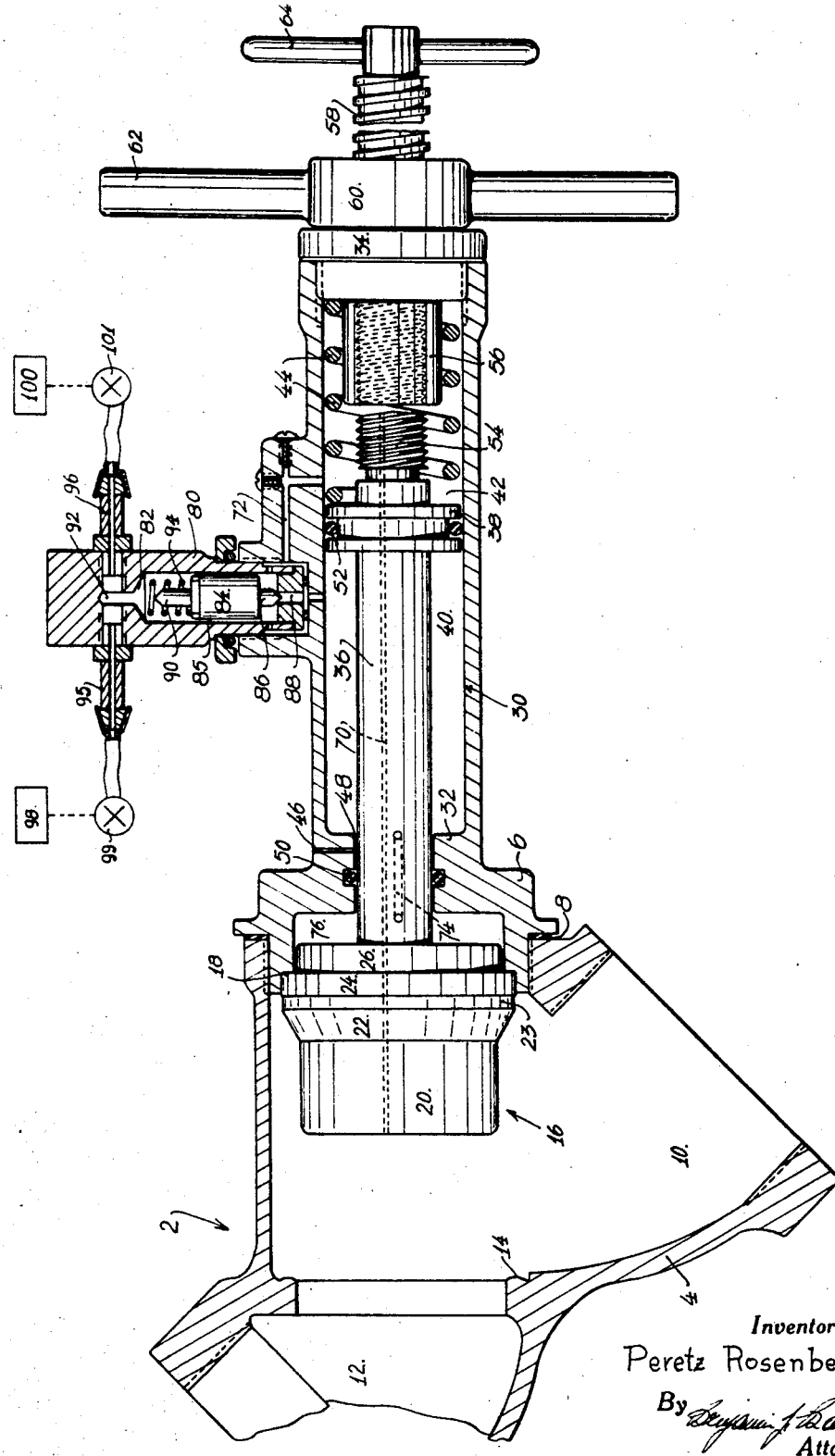

3,400,734
AUTOMATICALLY RESPONSIVE SHUTOFF VALVE
Peretz Rosenberg, Moshav Beit Shearim, Israel
Filed Mar. 22, 1966, Ser. No. 536,365
Claims priority, application Israel, Mar. 25, 1965, 23,222
10 Claims. (Cl. 137—495)

The present invention relates to automatically responsive shutoff valves, an object of the invention being to provide a valve which, by its inherent design, can be applied so as to automatically respond to one or more conditions. Such valves are particularly useful in irrigation systems where it may be desired to automatically close the valve in response to the drop of water pressure, the expiration of a certain time interval, the flow of water above a desired maximum rate the passage of a predetermined quantity of water, or many other conditions that may occur.

Briefly, the invention provides a valve having a plurality of communication paths to a movable valve member, each of which paths may be controlled for actuating the valve member.

The invention may take a number of forms, but is herein described with reference to the accompanying drawing which illustrates, by way of example only, one preferred embodiment of the invention.

The valve illustrated in the drawing comprises a valve housing, generally designated 2, having two sections 4 and 6 attached together, as by threading, with a sealing washer 8 inbetween. Section 4 is formed with an inlet port 10, an outlet port 12, and a valve seat 14 between the two ports. A valve member, generally designated 16, is movable from the illustrated open position where it rests against a seat 18 formed on housing section 6, to a closed position against valve seat 14. The valve member comprises a guide section 20 preferably of metal, adapted to guide the valve through the opening bordered by valve seat 14; a valve section 22, preferably of rubber, adapted to engage seat 14 when the valve is closed; a connecting section 23, preferably of metal, a second valve section 24, preferably of rubber, adapted to engage seat 18 when the valve is in its open position; and a further guide section 26, preferably of metal, adapted to guide the valve member through the opening in section 6 bordered by seat 18.

Housing 2 is formed with a chamber 30 which is delimited at one end by a wall 32 and at the other end by an end plug 34. The valve member 16 carries a valve stem 36 passing through an opening in wall 32 and extending into chamber 30. A piston 38 is carried at the opposite end of the valve stem 36 and divides the chamber into two compartments, compartment 40 adjacent to wall 32 and compartment 42 remote from that wall. A coil spring 44 is disposed in compartment 42, between the rear face of piston 38 and the end plug 34, so as to bias the valve member to its closed position. In addition, the housing is formed with a vent 46 to the atmosphere, this vent being made to be slow-acting by making the space 48 between the piston stem 36 and the wall of the housing very small. A sealing ring 50 is applied between the housing and the front end of stem 36, and a further sealing ring 52 is applied to the piston 38.

The end of stem 36 is threaded at 54 and is adapted to be detachably received in a correspondingly threaded end 56 of a screw bolt 58 passing through end plug 34 of the valve housing. The outer surface of screw bolt 58 is also threaded so as to be extensible and retractable with respect to the housing by means of a nut member 60 carrying a handle 62. The outer end of screw bolt 58 is apertured and receives a second handle 64.

The valve member 16 is formed with a longitudinally extending bore 70 passing through it from the front side of the valve member to the rear side of the stem 36, and thus providing a communication path between the front side of the valve member and compartment 42 of chamber 30. The latter compartment is made to communicate with compartment 40 by means of a bridge 72 forming a second communication path, the bridge having an inlet opening leading into compartment 42 and an outlet opening leading into compartment 40. A third communication path is provided, between compartment 40 and the rear face of valve member 16, this latter path is formed by a duct 74 in stem 36 leading from compartment 40 to a recess 76 contiguous to the rear face of valve member 16. The surface area of the latter recess is larger than that of the rear face of piston 38. Duct 74 may take several equivalent forms, for example, a longitudinally extending groove in the surface of stem 36, or a longitudinally extending bore within the stem and having a radial opening at each end so as to provide communication between compartment 40 and recess 76. As can be seen from the drawing, this path of communication is open only when the valve member is in the open position.

The above-described arrangement thus provides three communication paths, namely: a first communication path formed by bore 70 for communicating the pressure at the forward face of the valve member to compartment 42; a second communication path formed by bridge 72 for communicating the pressure from compartment 42 to compartment 40; and a third communication path comprising duct 74 and recess 76 for communicating the pressure from compartment 40 to the rear face of the valve member. By controlling one or more of these communication paths, a force may be applied to the rear face of the valve member which, when added to the force of spring 44, is sufficient to move the valve member to its closed position. In the described embodiment, this control means is applied to the communication path formed by bridge 72, such that the bridge is opened in order to close the valve.

For purposes of controlling the communication path formed by bridge 72, the valve housing includes a further section 80 formed with an internal opening defining a further chamber 82. A plunger 84 is movable within chamber 82, being slightly spaced at 85 therefrom, and carries a control valve 86 at the lower end adapted to seat in an opening 88 formed at the lower end of housing section 80, and an upper valve 90 adapted to seat in an opening 92 formed at the upper end of the housing section. A coil spring 94 is disposed within the housing so as to bias the plunger 84 downwardly, tending to close opening 88. The upper opening 92 communicates with one or more connections, two being shown and indicated as 95 and 96, each of which may be attached to some external control device for controlling the main valve 16. As an example, control device 98 may be a timer controlling a small valve 99 which opens connection 95 when it is desired to close the main valve, and external control device 100 may be a flow responsive device controlling a small valve 101 which opens connection 96 to close the main valve when the rate of flow through outlet port 12 exceeds a predetermined maximum rate.

Plunger 84 is slightly spaced from chamber wall 82 so that the water will seep around the plunger and fill the top of the chamber. Thus, when both connections 95 and 96 are closed, the pressure on both sides of the plunger will be substantially equal, whereby spring 94 will maintain the plunger in its lower position with valve 86 closing opening 88 when either connection is opened, the pressure in the chamber 82 above the plunger is released, thus enabling the pressure from compartment 42 and duct 72 to lift the plunger, against spring 94, and to open duct 72 to compartment 40. However, an intermittent opening and closing effect is produced with respect to valve 86 as will be described below:

The system operates as follows: Assuming the main valve 16 is closed, it may be opened by threading screw bolt 58 into threaded end 54 of the piston stem 36 this being accomplished by turning handle 64 to turn the screw bolt. Once the piston stem is attached, handle 62 may then be rotated to withdraw the screwbolt 58, and thus to move valve member 16 from sea 14 against seat 18. The arrangement is usch that when the valve is in its open position, the inlet pressure applied to the forward face of the valve member normally retains it open against the bias of spring 44. This inlet pressure is communicated to the rear face of piston 38 through bore 70, but the area of recess 76 is sufficiently larger than the surface area at the rear face of piston 38 so that the force applied against the latter surface when combined with the force of spring 44, is insufficient to close the valve.

In this condition of the valve, it is assumed that the communication path between compartments 42 and 40 formed by duct 72 is closed, which would be the case when the connections 95 and 96 are both closed by their respective control devices 98 and 100, so that spring 94 biases plunger 84 to the downward position where valve 86 closes opening 88.

It is thus seen that when the communication path formed by duct 72 is closed, the valve 16 is retained in its open position by the inlet pressure.

During the opening movement of the valve member, assuming there is water pressure in the line to which the valve is connected, water flows into recess 76 and through duct 74 into compartment 40. At the completely opened position of the valve, the water pressure in recess 76 and in compartment 40 is at atmospheric pressure because of the action of vent 46.

In order to make the valve automatically responsive to the desired one or more conditions, as controlled by control devices 98 and 100, it is necessary to disconnect screw bolt 58 from the threaded end 54 of piston 36. This may be accomplished by rotating handle 64 to unthread the screw bolt, and then rotating handle 62 to withdraw the screw bolt from the end of the housing. The valve is now in condition for automatic operation.

First, the valve will automatically respond to a drop in the inlet pressure even when the communication path formed by duct 72 remains closed. This is self-apparent since the inlet pressure retains the valve open against the action of spring 44, and therefore if the inlet pressure drops below a minimum value, spring 44 will be sufficient to close the valve.

The valve will also automatically close in response to timer 98 which opens its small valve 99, and thereby connection 95, at the time it is desired to close main valve 16. The valve will also automatically close in response to rate of flow device 100 which may be arranged to sense the rate of flow through outlet port 12 and to open its small valve 101, and thereby connection 96, if the rate exceeds a maximum value.

In either case, if either connection 95 or 96 is opened, the pressure within chamber 92 above plunger 84 is released permitting the pressure from compartment 42 applied through duct 72 to lift the plunger and to unseat valve 86 from opening 88, thus establishing the communication between compartments 42 and 44. This pressure is applied to the front face of piston 38, but the force on the piston is cancelled by the same pressure being applied to the rear face of the piston from compartment 42. The pressure in compartment 40, however, is also applied to the rear face of valve member 16, through duct 74 and recess 76, and this force, together with the action of spring 44, is sufficient to overcome the force on the front face of valve member 16, and thereby to move the valve toward its closed position. As the valve moves toward its closed position, piston 38 traverses the opening into compartment 40 from duct 72. The pressure applied through this duct from compartment 42 is now applied against the rear face of piston 38, and thus assists in the closing movement of the valve. The pressure within compartment 40 is released to the atmosphere through slow-acting vent 46.

It is thus seen that spring 44 applies the main force for starting the closing movement of the valve, and that this force is then augmented by the force applied through duct 72 to the rear face of piston 38 during the closing movement.

The control valve arrangement in bridge 72 produces an intermittent or hammering effect which assures the unseating of main valve 16 at the beginning of the closing operation. This hammering effect is produced in the following manner:

When plunger 84 moves upwardly during the unseating of the lower control valve 86 from opening 88 it also moves the upper control valve 90 into opening 92, and thus closes the opened connection. As indicated earlier, the space between plunger 84 and the wall of the chamber 82 is such that the water flowing into the chamber from duct 72 will seep through this space and thus, after a short time interval, will cause the pressure from compartment 42 also to be applied to the top of the plunger, as well as to the bottom. Spring 94 will then cause the plunger to fall, closing opening 88. This also causes valve 90 to open opening 92, thereby releasing the pressure on the top face of the plunger and causing the plunger to move upwardly again by the pressure from compartment 42. Thus, the pressure is transferred from compartment 42 to compartment 40 intermittently, this pressure being also intermittently applied against the rear face of the valve member 16 in the manner described above.

During the closing movement of the main valve 16, the water in compartment 40 is released through vent 46 and brakes the movement of the valve. Positive closure of the valve is assured since the pressure from the outlet port 12 is communicated through ducts 70 and 72 to be applied against the rear face of piston 38.

What is claimed is:

1. A valve comprising a valve housing having an inlet port and an outlet port; a valve seat between the two ports; a valve member movable from an open position away from the valve seat to a closed position against the valve seat; spring means biasing the valve member to its closed position; said valve member being disposed with respect to the inlet port so that when the valve member is in its open position the inlet pressure is applied to the front face of the valve member and normally retains the valve member in the open position against the action of said spring means; a chamber delimited at one end by a wall formed in the housing; a valve stem carried by the valve member and passing through said wall into the chamber; said valve stem carrying piston, dividing said chamber into a first compartment adjacent to said wall and a second compartment remote from said wall; a first communication path for communicating the pressure at the front face of the valve member to said second compartment; a second communication path for communicating the pressure in said second compartment to said first compartment; a third communication path for communicating the pressure in said first compartment to the rear face of the valve member; and control means for controlling at least one of said communication paths to apply a force on the rear face of the valve member which, when added to the force of said spring means, is sufficient to move the valve member toward its closed position.

2. A valve according to claim 1, wherein said second communication path comprises a bridge having an inlet opening leading into said second compartment and an outlet opening leading into said first compartment, said inlet and outlet opening being thus in communication with the rear and front faces, respectively, of the piston when the valve member is in its open position.

3. A valve according to claim 2, wherein said bridge outlet opening is disposed so that the piston traverses same when the valve member moves towards its closed position, whereupon during the course of the movement of the valve member to its closed position, the application of the pressure is transferred from the front face of the piston to the rear face of the piston and thus augments the closing force applied to the valve member.

4. A valve according to claim 1, wherein said first communication path comprises a bore passing through the valve member and the valve stem.

5. A valve according to claim 1, wherein said third communication path comprises a recess formed in the said housing wall contiguous to the rear face of the valve member when the latter is in its open position, and a duct formed in the valve stem to provide communication between said recess and said first compartment when the valve member is in its open position.

6. A valve according to claim 5, wherein the surface area of said recess contiguous to the rear face of the valve member is larger than the surface area of the rear face of the piston, and wherein said first compartment is vented to the atmosphere through a slow-acting vent.

7. A valve according to claim 1, wherein said control means controls at least one of said communication paths so as to apply an intermittent force against the rear face of the valve member.

8. A valve according to claim 1, further including means enabling the manual opening of the valve member, said latter means including a member passing into said second compartment and detachably connected to the valve stem.

9. A valve according to claim 1, wherein said control means includes a timer device.

10. A valve according to claim 1, wherein said control means includes a flow-responsive device which senses the rate of flow through the outlet port of the valve.

References Cited
UNITED STATES PATENTS 2,969,806   1/1961   Jensen _____ 137—495

ALAN COHAN, *Primary Examiner.*

H. WEAKLEY, *Assistant Examiner.*